Figure 1:
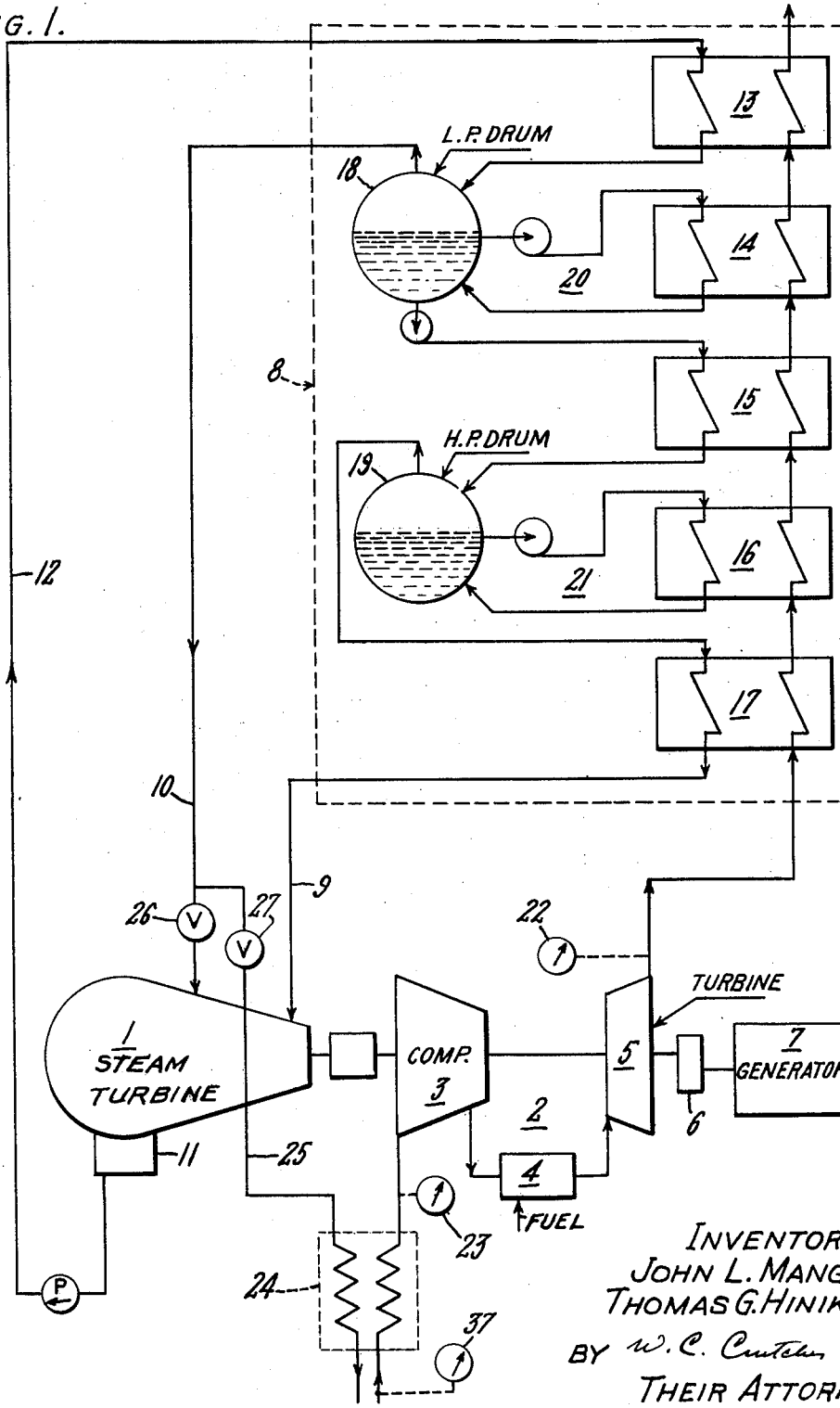

Sept. 29, 1964   J. L. MANGAN ETAL   3,150,487
STEAM TURBINE-GAS TURBINE POWER PLANT
Filed April 8, 1963   4 Sheets-Sheet 1

INVENTORS
JOHN L. MANGAN
THOMAS G. HINIKER
BY W. C. Crutcher
THEIR ATTORNEY

INVENTORS
JOHN L. MANGAN
THOMAS G. HINIKER
BY W. C. Crutcher
THEIR ATTORNEY

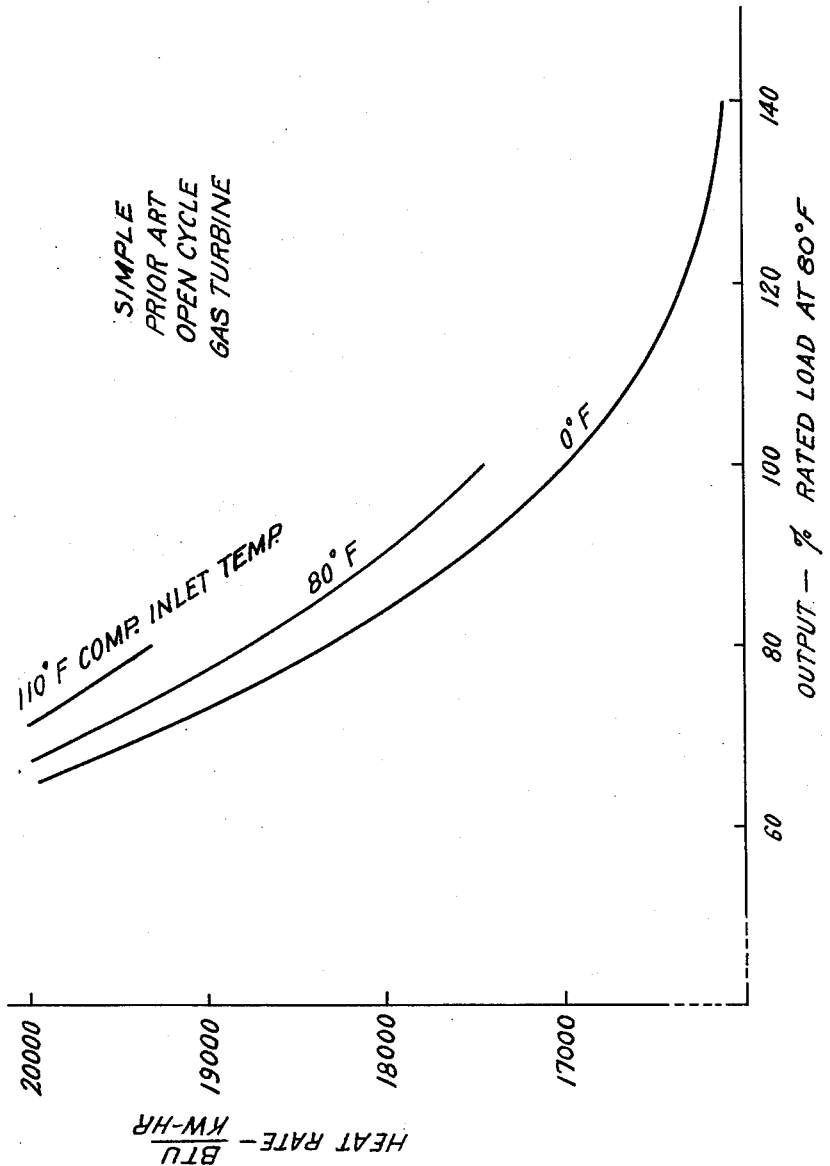

Sept. 29, 1964   J. L. MANGAN ETAL   3,150,487
STEAM TURBINE-GAS TURBINE POWER PLANT
Filed April 8, 1963   4 Sheets-Sheet 4
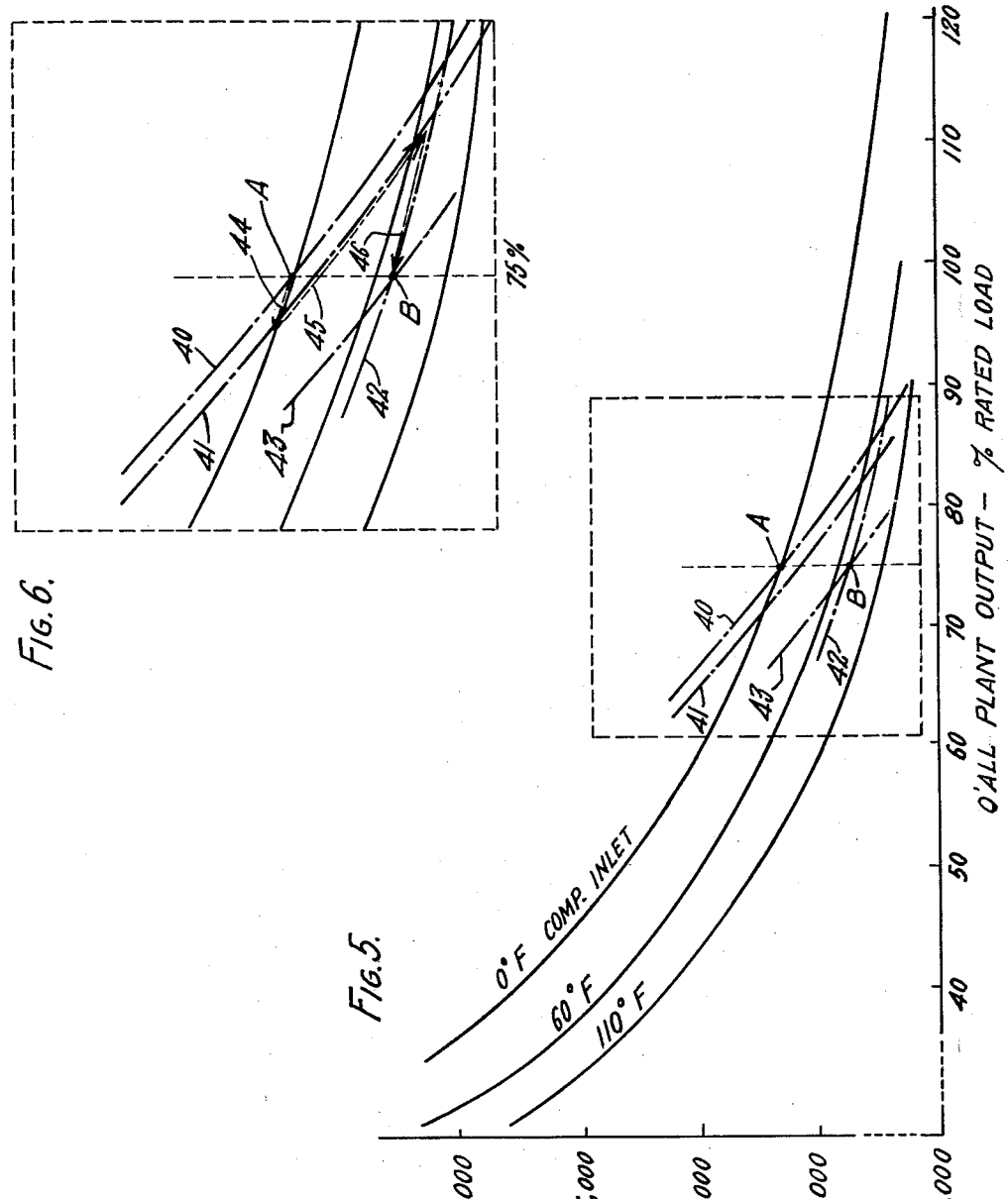
INVENTORS
JOHN L. MANGAN
THOMAS G. HINIKER
BY W. C. Crutchen
THEIR ATTORNEY

United States Patent Office 3,150,487
Patented Sept. 29, 1964

3,150,487
STEAM TURBINE-GAS TURBINE POWER PLANT
John L. Mangan and Thomas G. Hiniker, Schenectady, N.Y., assignors to General Electric Company, a corporation of New York
Filed Apr. 8, 1963, Ser. No. 271,141
7 Claims. (Cl. 60—39.18)

This invention relates to improvements in efficiency of an integrated power plant employing a gas turbine with a steam turbine driven by steam generated by exhaust gas from the gas turbine. More particularly, the invention relates to improvements in efficiency of such a combined power plant when it is operating at part load.

It is a well known fact that the thermal efficiency of a gas turbine decreases with an increase of the temperature of the air entering the gas turbine compressor. Expressed in another way, the "heat rate" (inverse of efficiency) is higher when the ambient air temperature is higher. This is because the work of compressing each pound of air is increased without increasing the gas turbine output, and hence, the net work available from each pound of air passing through the gas turbine is decreased. For this reason, it is usually possible to exceed the "rated" output of the ordinary open cycle gas turbine by operating it in air of an ambient temperature below the reference temperature at which the gas turbine is rated. It may be summarized, then, that the compressor work, for a fixed pressure ratio, is proportional to the absolute temperature at the compressor inlet, and that increased temperature of compressor inlet air in the ordinary gas turbine lowers its available output and efficiency.

Heat exchangers have been employed in the past to raise the thermal efficiency (reduce the "heat rate") of simple cycle gas turbines. These have included "intercoolers" to reduce the work of compression by cooling air between two compressor stages of "precoolers" to cool the fluid entering the first stage of the compressor. This compressor inlet air cooling has the same effect in decreasing the heat rate as does operating a simple cycle gas turbine in air of low ambient temperature, as explained above. Heat exchangers have also been employed as "regenerators" to preheat the compressed air entering the combustion chamber by means of the turbine exhaust gases, so as to reduce the amount of fuel required to heat the air. This does not affect the work of compression in the manner explained above, since the heating takes place after compression has been accomplished.

Searches for further reduction in heat rate have led to proposals for combined steam turbine-gas turbine power plants, wherein the turbine exhaust gases are passed over steam generating coils and the steam is then led to a steam turbine to extract further work from heat which would otherwise be lost to the atmosphere. Such a heat recovery arrangement for generating multi-pressure steam from the gas turbine exhaust is disclosed in co-pending application Serial No. 241,653 filed in the name of Howard F. May on December 3, 1962, and assigned to the assignee of the present application.

The combined cycle described above behaves quite differently from ordinary gas turbines or steam turbines operating by themselves. More specifically, the steam generated, and hence the output of the steam turbine, is heavily dependent upon the functioning of the gas turbine. More particularly, the gas turbine exhaust temperature and the mass flow of gas flowing through the gas turbine determine the quantity, pressure and temperature of steam generated. The gas turbine exhaust temperature, in turn, depends upon the load and is lower during part load. "Part load" is defined here as any output which is less than the maximum output capability of the gas turbine at a given compressor inlet temperature. (It will be noted from this definition and from the usual method of rating a gas turbine for a given output at a given ambient temperature, that it is possible for the turbine to be at "part load" even though it is exceeding the "rated" output on the turbine nameplate.) Maximum exhaust temperature for a given compressor inlet temperature, and hence maximum steam generation in the combined cycle, is achieved when the gas turbine is operating at maximum output capability. The exhaust temperature, and hence the steam generation, drops off when the gas turbine is operating at part load. The lower efficiency of the gas turbine at part load and the fact that less and lower temperature steam is being generated by the gas turbine exhaust gases have a cumulative effect causing a rapid fall-off in thermal efficiency or increase in heat rate at part load.

Accordingly, it is an object of the present invention to provide a means for increasing the thermal efficiency of a combined steam turbine-gas turbine power plant operating at part load.

Another object of the invention is to provide an arrangement for attaining a lower part load heat rate for a combined steam turbine-gas turbine power plant at given ambient air conditions than would normally be possible.

A more specific object of the invention is to provide an arrangement for reducing the increase in heat rate which would otherwise occur at reduced load in a combined steam turbine-gas turbine power plant, under conditions of relatively low ambient temperature.

Figure 3:
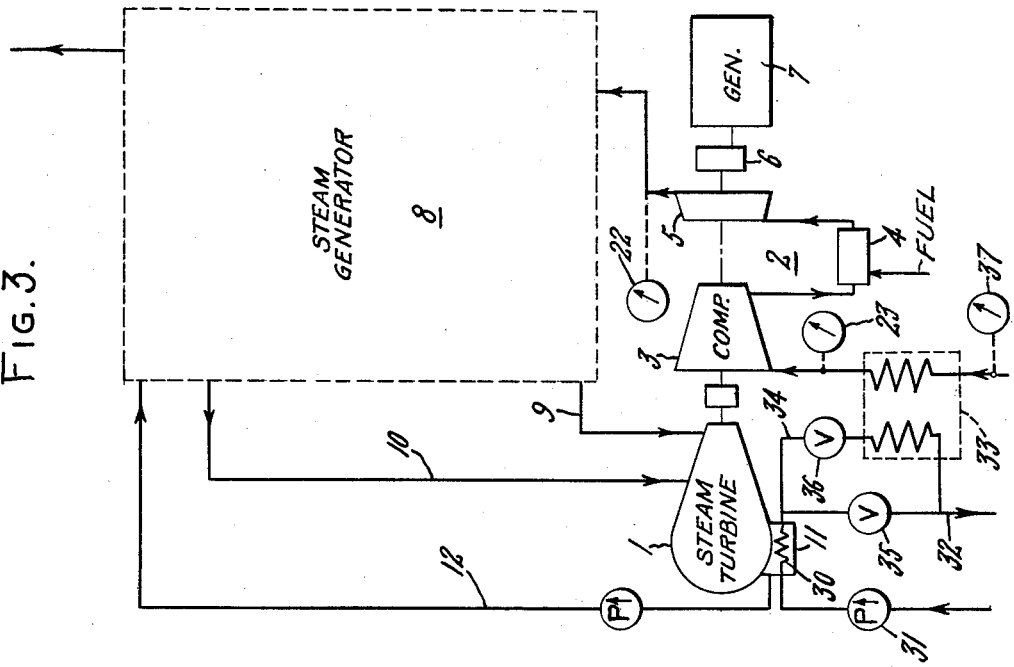
Figure 2:
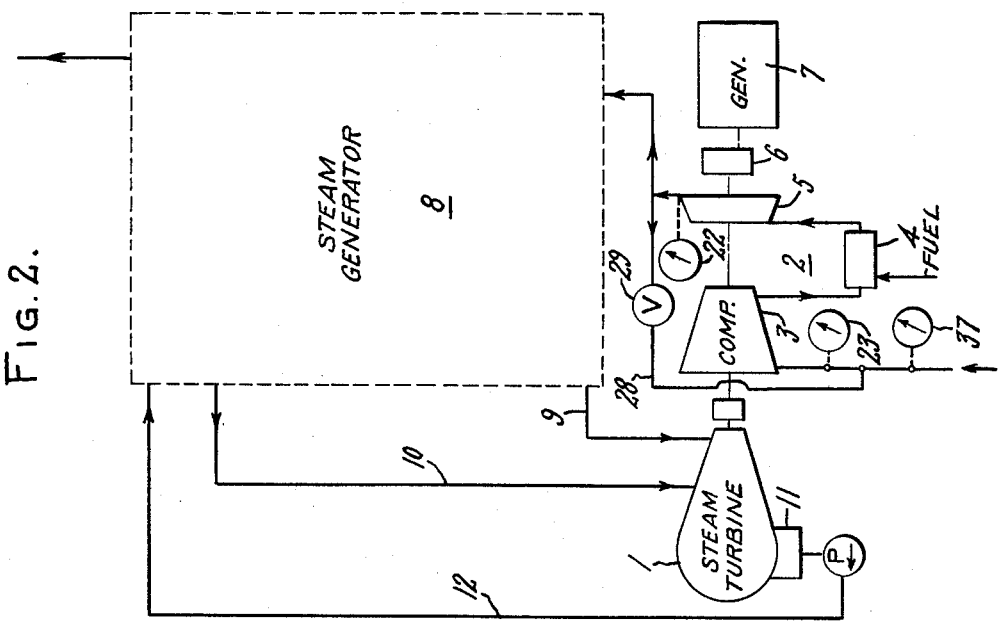

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic view of a combined steam turbine-gas turbine power plant utilizing the invention, FIGS. 2 and 3 are simplified schematic views of the same power plant employing two modifications of the invention, FIG. 4 is a graph of heat rate versus output for a prior art open cycle gas turbine at different compressor inlet temperatures, FIG. 5 is a graph of heat rate versus over-all plant output for a combined power plant at different compressor inlet temperatures, and FIG. 6 is an enlarged view of a portion of the graph shown in FIG. 5.

Briefly stated, the invention is practiced by heating the compressor inlet air with heat derived directly or indirectly from the gas turbine exhaust. The increased steam turbine work available, due to the higher exhaust gas temperatures prevailing in the steam generator, more than offset the increase in compressor work required for the gas turbine, thereby increasing the thermal efficiency of the combined plant.

Referring now to FIG. 1 of the drawing, a combined power plant is shown for generating multi-pressure steam for a steam turbine by means of the exhaust gas from a gas turbine. A steam turbine 1 is coupled to a gas turbine shown generally at 2, the latter comprising a compressor section 3, a combustion chamber 4, and a turbine section 5. Steam turbine 1 and gas turbine 2 are connected, by means of a gear box 6, to drive a load such as generator 7. The exhaust from turbine section 5 of gas turbine 2 passes through a steam generator, shown generally as 8, and then exhausts to the atmosphere. Steam generator 8 provides high pressure superheated steam to the inlet of steam turbine 1 through high pressure supply line 9 and also provides low pressure saturated steam, which is introduced to a lower pressure section of turbine 1 by means of the low pressure supply line 10. Condensate from condenser 11 returns to steam generator 8 via the feed water line 12.

A practical form of steam generator 8 may be seen in the aforementioned co-pending application Serial No. 241,653. Here, however, it is depicted schematically as a series of heat exchangers 13-17, in which the temperature of the gas turbine exhaust gas is lowered while extracting heat therefrom. Commencing with the lowest temperature section on top, these are, low pressure economizer 13, low pressure evaporator 14, high pressure economizer 15, high pressure evaporator 16, and high pressure superheater 17. A low pressure steam drum 18, accumulates saturated low pressure steam and supplies it to low pressure supply line 10. A high pressure drum 19, accumulates saturated high pressure steam and supplies it to high pressure supply line 9, this steam first passing through superheater 17 en route to the turbine. Substantial recirculation of water through the evaporators 14, 16 is provided by the piping loops 20, 21 respectively, and their associated recirculating pumps. The foregoing two pressure steam generator is shown only for purposes of illustration, and the invention is also applicable to steam generation at a single or at multiple pressure levels.

Although it will be understood that many other instruments are necessary to this type of power plant, those most pertinent to the present invention include a means to monitor the exhaust temperature from the outlet of turbine section 5, such as a temperature responsive device 22, and means to monitor the compressor inlet temperature, such as temperature responsive device 23. The temperature responsive device 22, can also be used to measure the load output of the gas turbine by means of known operating characteristics thereof. A third temperature responsive device 37 measures ambient air temperature.

According to the present invention, a heat exchanger 24 is provided to raise the compressor inlet temperature. This is done in FIG. 1 by means of low pressure steam from a bypass line 25, connected to low pressure line 10. The amount of low pressure steam diverted from line 10 is controlled by valves 26, 27, which may be either manually or automatically controlled by means known in the art. Reducing the flow through valve 26 and increasing the flow through valve 27, will cause an increased flow of steam through line 25 and heat exchanger 24, to increase the temperature of the compressor inlet air, measured by the temperature responsive device 23. It will be observed that the heat transferred to the compressor inlet air in heat exchanger 24, is derived indirectly from the exhaust gas from the turbine section 5, through the medium of the low pressure steam in steam generator 8.

Referring now to FIG. 2 of the drawing, a modification of the invention is shown. The details of steam generator 8 are omitted for clarity and the remaining elements have the same reference numbers as in FIG. 1.

In FIG. 2, instead of employing a heat exchanger to preheat the compressor inlet air, a portion of the exhaust from turbine section 5 is recirculated through a line 28, the flow being controlled by a manual or automatic valve 29. The recirculated exhaust gas mixes directly with the incoming compressor inlet air and raises its temperature. It may be thought at first glance that the recirculated gases might impair combustion in the combustion chamber 4, but it must be observed that ordinarily a gas turbine operates with air greatly in excess of the stoichiometric ratio, for example, on the order of 300% to 600% excess air and the ordinary gas turbine exhaust can be recompressed and reburned several times without adding additional air.

Referring to FIG. 3 of the drawing, another modification is illustrated. The steam turbine condenser 11 is normally cooled by means of water pumped through condenser cooling coils 30 by means of a pump 31. The cooling water is heated as it passes through coils 30 and discharges through a line 32. According to the invention, an additional heat exchanger 33, is employed to preheat the compressor inlet by air by means of a portion of the heated water from coils 30 bypassed through a bypass line 34. The amount of condenser cooling water which is bypassed through heat exchanger 33 is controlled by means of manually or automatically operated valves 35, 36. Closing valve 35 and opening valve 36, will increase the rate of flow through heat exchanger 33 which will increase the compressor inlet temperature, measured by temperature responsive device 23.

The operation and advantages of the invention will be better understood by first considering the performance of a simple open cycle gas turbine (comprising a compressor, combustion system, and gas turbine) as shown on the graph of FIG. 4. The components of such a prior art gas turbine are indicated generally at 2 in FIGS. 1-3. The abscissa indicates gas turbine output in percent of rated load when the gas turbine is operating in 80 deg. F. ambient air taken as a reference. The ordinate indicates heat rate expressed as B.t.u.'s in the fuel consumed per kilowatt hour of generator output. A lower heat rate indicates a greater thermal efficiency of the gas turbine.

It will first be observed that, since the turbine is rated for 80 deg. F. ambient air, greater than 100% "nameplate" output is available when operating, for example, in 0° F. air. It will next be observed that at part load, such as 80% output (at 80° F.), an increase in compressor inlet temperature raises the heat rate (decreases the efficiency) of the gas turbine.

Referring now to FIG. 5 of the drawing, a similar graph is drawn of heat rate versus power plant output for a combined steam turbine-gas turbine arrangement similar to the ones shown in FIGS. 1, 2, and 3. It is particularly to be observed that the curves for different compressor inlet temperatures are exactly reversed from those shown in FIG. 4, i.e. the lower compressor inlet temperature curves are on top. This is because the decrease in efficiency of the gas turbine which would otherwise occur as the compressor inlet temperature was raised, is more than offset by an increase in steam generation due to the hotter turbine exhaust gas passing through the steam generator. The result is that at a given load, the combined steam-gas turbine plant can operate more efficiently at higher compressor inlet temperatures, provided that the temperature at the gas turbine buckets does not exceed a value which is limited by the bucket materials.

According to the invention, when operating at part load, the compressor inlet temperature is raised above ambient air temperature to the greatest extent possible without adding additional fuel or without exceeding permissible bucket temperatures in the gas turbine 5. This may be done by means of heat in the gas turbine exhaust which would otherwise be put to a less efficient use in the cycle. Such means include diverting a portion of the low pressure steam from steam generator 8 through a heat exchanger (FIG. 1), recirculating a portion of the gas turbine exhaust gas to the compressor inlet (FIG. 2), passing a portion of the heated condensate cooling water through a compressor inlet heat exchanger (FIG. 3) or by other means of heat recovery which will be apparent to those skilled in the art once the principle of the invention is understood. This serves to raise the compressor inlet temperature at a given load, thereby moving toward a lower (more efficient) heat rate, as exemplified by FIG. 5. The amount by which the compressor inlet temperature should be raised is calculated with due regard to the load on the power plant, the ambient air temperature, and the heat which may be lost to other portions of the cycle by using it to preheat the compressor inlet air.

As an example of the calculations, FIG. 5 shows that a given steam turbine-gas turbine combined plant similar to the plant of FIG. 1 operating at 75% load in ambient air of 0° F., would have a heat rate of approximately 12,500 B.t.u. per kilowatt hour as illustrated by point A on the graph. Line 40 is a curve along which the fuel supplied to the combined plant of FIG. 1 is constant, indicating that increased load at the same fuel consumption would require an increase in compressor inlet temperature. Line 41 is a curve for the same rate of fuel consumption as line 40 but assuming that the low pressure steam in line 10 of FIG. 1 is not furnished to steam turbine 1 but is disconnected. Line 42 is a segment of a constant compressor inlet temperature curve similar to the curves shown in full. Line 43 passing through line 42 at point B on the 75% rated load line is a curve of constant fuel consumption, similar to curve 40 but at a lower rate of fuel consumption.

Referring to FIG. 6 of the drawing which is an enlargement of the portion shown in dotted lines on FIG. 5, a step-by-step analysis will show how a reduction in heat rate from A to B can be achieved if all of the low pressure steam from supply line 10 of FIG. 1 is diverted through the compressor air preheater 24, with the power plant operating at 75% load in 0° F. ambient air. First the steam line 10 is considered to be disconnected and the load is reduced along the 0° F. compressor inlet temperature line as shown by the dotted arrow 44. This represents the loss in available output from the cycle and a consequent increase in heat rate caused by loss of work from the low pressure steam in steam turbine 1. Arrow 44 terminates at fuel consumption line 41 which represents the same fuel consumption as line 40 without this low pressure steam going to turbine 1.

Next, one proceeds downward to the right along the fuel consumption line 41, as indicated by dotted arrow 45, terminating at a higher compressor inlet temperature line 42. This compressor inlet temperature 42 may be calculated by knowledge of the characteristics of heat exchanger 24, temperature of low pressure steam 10, and the flow rates of steam and compressor air. Arrow 45 represents the gain in turbine output which could be obtained at the same fuel consumption as before by using the low pressure steam from conduit 10 to preheat the compressor inlet air in heat exchanger 24.

Next, to convert this increased available output to the same 75% output at which we started, one proceeds along the constant compressor inlet temperature line 42, as indicated by arrow 46 terminating at the original part load of 75% represented by point B. Arrow 46 represents the decrease in required fuel by operating at the original part load of 75%, utilizing the compressor inlet heating of the invention. This decreased fuel rate for the combined plant, at the same plant output, is indicated by line 43. Thus, a substantial decrease in heat rate can be achieved under certain conditions of part load and low ambient temperature.

It will be appreciated that the foregoing detailed analysis can be precalculated from the known characteristics of the power plant and used with charts to effect station improvements through manual control. The improved operation can also be carried out automatically by an analog computer, using ambient air temperature, compressor inlet temperature, and gas turbine outlet temperature from temperature responsive devices 22, 23, 37 as inputs and controlling automatic valves such as valves 26, 27, 29, 35, 36 in FIGS. 1 through 3.

Although the cycle shown utilizes the heat in the gas turbine exhaust gases to generate steam for a steam turbine, the heat could also be utilized in other ways without departing from the concept of the invention. For instance, the heat could be employed to generate process steam. At part load on the gas turbine, therefore, a portion of the heat in the exhaust gases used to preheat the compressor inlet air will raise the temperature of the exhaust gases and thereby increase the heat energy which can be recovered from each pound of exhaust gas leaving the gas turbine.

While there have been described herein a basic arrangement and two modifications thereof, other similar modifications will become apparent to those skilled in the art. It is desired to cover in the appended claims all such modifications as fall within the true spirit and scope of the invention.

What we claim as new and desire to secure by Letters Patent of the United States is:

1. A combined steam turbine-gas turbine power plant comprising:
   a gas turbine having in series a compressor section receiving ambient air, air heating means, and a turbine section discharging hot exhaust gases,
   a steam generator heated by the exhaust gases from said turbine section,
   a steam turbine receiving steam from said steam generator, and
   means supplying a portion of the heat energy in said gas turbine exhaust gases to the air entering said compressor section to heat the incoming air above ambient temperature and thereby improve the overall thermal efficiency of the power plant.

2. A powerplant comprising:
   a gas turbine having a compressor section receiving air through an inlet and having a turbine section driving a load device and discharging hot exhaust gases,
   a steam generator heated by the exhaust gases from said turbine section,
   a steam turbine receiving steam from said steam generator,
   means circulating a fluid at a temperature above ambient air temperature in heat exchange relationship with the air entering the compressor section, and
   valve means for controlling said circulated fluid to preheat the compressor inlet air by an amount selected in accordance with the ambient temperature and the load driven by the gas turbine to increase the over-all thermal efficiency of the plant.

3. The combination according to claim 2, wherein said fluid circulating means comprises a conduit diverting a portion of the steam from said steam generator through a heat exchanger disposed in the air inlet to the compressor section.

4. The combination according to claim 2, wherein said fluid circulating means comprises a conduit connected to supply hot exhaust gases from the turbine section to the air inlet of the compressor section.

5. The combination according to claim 2 and having a fluid-cooled condenser for the steam turbine, wherein said fluid circulating means comprises a conduit supplying at least a portion of the condenser cooling fluid to a heat exchanger disposed in the air inlet to the compressor section.

6. In a combined steam turbine-gas turbine power power plant, the combination of:
   a gas turbine including a compressor section with an inlet, a combustion chamber receiving air from the compressor section, and a turbine section receiving heated air from the combustion chamber and discharging hot exhaust gases,
   a steam generator comprising a plurality of heat exchange sections heated in succession by exhaust gas from the turbine section and supplying steam at least two pressure levels to a plurality of outlets,
   a steam turbine coupled to said compressor and turbine sections and having a first inlet receiving high pressure steam from the steam generator and a second inlet receiving lower pressure steam from the steam generator,
   conduit means connecting the lowest pressure outlet from the steam generator with the second steam turbine inlet,
   a bypass conduit connected to said conduit means and including valve means for diverting a selected portion of low pressure steam through said bypass conduit, and heat exchanger means disposed in the compressor section inlet and arranged to transfer heat from low pressure steam received from the bypass conduit to air entering the compressor section.

7. The method of improving the part load efficiency of a combined steam-gas turbine power plant having a gas turbine and a steam turbine supplied with steam generated by the heat of the gas turbine exhaust gases which includes preheating the air entering the gas turbine compressor by an amount selected in accordance with ambient air temperature and the load driven by the gas turbine and steam turbine to increase the over-all thermal efficiency of the power plant.

No references cited.